United States Patent
McCloskey et al.

(10) Patent No.: US 6,518,391 B1
(45) Date of Patent: Feb. 11, 2003

(54) METHOD OF POLYCARBONATE PREPARATION BY SOLID STATE POLYMERIZATION

(75) Inventors: Patrick Joseph McCloskey, Watervliet; James Day, Scotia; Paul Michael Smigelski, Jr.; Timothy Brydon Burnell, both of Schenectady, all of NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/911,505

(22) Filed: Jul. 24, 2001

(51) Int. Cl.[7] ............................................... C08G 64/00
(52) U.S. Cl. ...................................... 528/196; 528/198
(58) Field of Search ................................... 528/196, 198

(56) References Cited

U.S. PATENT DOCUMENTS

| | | |
|---|---|---|
| 4,323,668 A | 4/1982 | Brunelle ..................... 528/173 |
| 5,717,056 A | 2/1998 | Varadarajan et al. ......... 528/196 |
| 5,905,135 A | 5/1999 | Idage et al. .................. 528/196 |
| 6,031,063 A | 2/2000 | Day et al. .................... 528/196 |
| 6,143,859 A | 11/2000 | Chatterjee et al. ........... 528/196 |

*Primary Examiner*—Terressa M. Boykin
(74) *Attorney, Agent, or Firm*—Andrew C. Caruso; Noreen C. Johnson

(57) ABSTRACT

Solid state polymerization of partially crystalline polycarbonate oligomers bearing ester-substituted terminal groups occurs at useful reaction rates despite their high level of endcapping. Partially crystalline polycarbonate oligomers having ester substituted terminal groups may be obtained in a single step by reaction of an ester substituted diaryl carbonate such as bis-methyl salicyl carbonate with a dihydroxy aromatic compound such as bisphenol A in the presence of a transesterification catalyst such as sodium hydroxide. Alternatively, amorphous oligomeric polycarbonates incorporating ester substituted endgroups may be obtained through careful control of the melt reaction conditions. The amorphous oligomeric polycarbonates are crystallized upon exposure to solvent vapor and subsequently undergo solid state polymerization at synthetically useful reaction rates.

50 Claims, 1 Drawing Sheet

METHOD OF POLYCARBONATE PREPARATION BY SOLID STATE POLYMERIZATION

BACKGROUND OF THE INVENTION

This invention relates to a method of polycarbonate preparation by solid state polymerization. The method further relates to a method for the preparation of partially crystalline precursor polycarbonates.

Polycarbonates are ranked among the most important of the world's engineering thermoplastics. Bisphenol A polycarbonate is currently the most widely used polycarbonate and its world wide annual production exceeds one billion pounds. Traditionally, polycarbonates have been prepared either by interfacial or melt polymerization methods. The reaction of a bisphenol such as bisphenol A (BPA) with phosgene in the presence of water, a solvent such as methylene chloride, an acid acceptor such as sodium hydroxide and an amine catalyst such as triethylamine is typical of the interfacial methodology. The reaction of bisphenol A with a source of carbonate units such as diphenyl carbonate at high temperature in the presence of a catalyst such as sodium hydroxide is typical of currently employed melt polymerization methods. Each method is practiced on a large scale commercially and each presents significant drawbacks.

The interfacial method for making polycarbonate has several inherent disadvantages. First, it is a disadvantage to operate a process which requires the use of phosgene, a reactant the handling, storage and use of which presents important safety concerns. Second, it is a disadvantage to operate a process which requires using large amounts of an organic solvent because expensive precautions must be taken to prevent the unintended escape of the organic solvent into the environment. Third, the interfacial method requires a relatively large amount of equipment and capital investment. Fourth, the polycarbonate produced by the interfacial process is prone to having inconsistent color, higher levels of particulates, and higher chloride ion content.

The melt method, although obviating the need for phosgene or an organic solvent such as methylene chloride requires high temperatures and relatively long reaction times. As a result, by-products may be formed at high temperature, such as the products arising by Fries rearrangement of carbonate units along the growing polymer chains. Fries rearrangement gives rise to undesired and uncontrolled polymer branching which may negatively impact the polymer's flow properties and performance.

More recently, polycarbonates have been prepared by solid state polymerization (SSP). SSP offers several advantages over both the melt phase process and the interfacial polycondensation process. SSP does not require the use of phosgene gas which forms an important element of the interfacial process. Additionally SSP utilizes considerably lower temperatures than those required for the preparation of high molecular weight polycarbonate by melt polymerization of a diaryl carbonate such as diphenyl carbonate and a bisphenol such as bisphenol A. Also, the SSP process, unlike the melt phase process, does not require handling highly viscous polymer melt at high temperatures and the special equipment capable of mixing polymer melt under vacuum at high temperature required in the melt process is not required to perform the SSP process.

In a solid state polymerization process, a precursor polycarbonate, typically a relatively low molecular weight oligomeric polycarbonate, is prepared by the melt reaction of a diaryl carbonate such as diphenyl carbonate with a bisphenol such as bisphenol A. In the preparation of bisphenol A polycarbonate oligomers, a diaryl carbonate such as diphenyl carbonate is heated together with bisphenol A in the presence of a catalyst such as sodium hydroxide while removing phenol formed as a by-product of the transesterification reaction between phenolic groups and diphenyl carbonate or phenyl carbonate endgroups. This oligomerization reaction is typically carried out under reduced pressure to facilitate the orderly removal of the phenol by-product. When the desired level of oligomerization has been achieved the reaction is terminated and the product oligomeric polycarbonate is isolated. The oligomeric polycarbonate so produced is amorphous and must be partially crystallized in order to be suitable for solid state polymerization.

The oligomeric polycarbonate may be partially crystallized by one of several methods, such as exposure of powdered or pelletized oligomer to hot solvent vapors, or dissolution of the amorphous oligomer in a solvent such as methylene chloride and thereafter adding a solvent such as methanol or ethyl acetate to precipitate crystalline oligomeric polycarbonate. Typically, such solvent vapor or liquid solvent crystallization methods result in partially crystalline oligomeric polycarbonates having a percent crystallinity between about 20 and about 40 percent as measured by differential scanning calorimetry. A percent crystallinity in this range is usually sufficient for the oligomeric polycarbonate to undergo solid state polymerization without fusion of the pellets or powder being subjected to SSP. In addition to solvent induced crystallization, oligomeric bisphenol A polycarbonate has been crystallized by dissolving diphenyl carbonate in molten amorphous polycarbonate oligomer followed by cooling the mixture to ambient temperature to afford partially crystalline polycarbonate as a mixture with diphenyl carbonate. Finally, amorphous oligomeric polycarbonates have been crystallized by prolonged heating at a temperature below the melting point of the partially crystalline polycarbonate. However, such thermally induced crystallization is quite slow relative to the aforementioned crystallization methods.

The partially crystalline oligomeric polycarbonate in a solid form such as a powder, particulate or pellet is then heated under solid state polymerization conditions at a temperature below the sticking temperature or melting point of the oligomeric polycarbonate, but above the glass transition temperature of the partially crystalline oligomeric polycarbonate, and the volatile by-products formed as chain growth occurs, phenol, diphenyl carbonate and the like, are removed. The polycondensation reaction which converts the low molecular weight oligomer to high polymer is effected in the solid state under these conditions.

Although modern solid state polymerization methods provide a valuable alternative to the melt and interfacial polycarbonate syntheses, the solid state polymerization method suffers from several disadvantages. Typically, the partially crystalline oligomeric polycarbonate polymer precursor must be prepared and crystallized in separate steps, and the solid state polymerization process itself is relatively slow, a typical solid state polymerization step requiring several hours. Thus improvements in the efficiency of the preparation of the partially crystalline precursor polycarbonate and enhancement of solid state polymerization rates are highly desirable.

BRIEF SUMMARY OF THE INVENTION

The present invention provides a method for the preparation of partially crystalline precursor polycarbonates in a single step and their conversion via SSP to high molecular weight polycarbonates. The partially crystalline precursor polycarbonates of the present invention are well suited to solid state polymerization owing to their level of crystallinity and their incorporation of ester-substituted phenoxy endgroups which are more reactive in chain growth reactions with hydroxy endgroups than are unsubstituted phenoxy endgroups. Unsubstituted phenoxy endgroups are present in partially crystalline precursor polycarbonates derived from dihydroxy aromatic compounds and diaryl carbonates lacking ester substitution, such as diphenyl carbonate. These and other objects of the invention will be more readily appreciated when considering the following disclosure and appended claims.

In one aspect, the present invention relates to a method of preparing polycarbonate by solid state polymerization, said method comprising heating to a temperature between about 120° C. and about 280° C. under solid state polymerization conditions a partially crystalline precursor polycarbonate comprising structural units derived from at least one dihydroxy aromatic compound, and endgroups having structure I

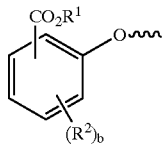

I wherein $R^1$ is a $C_1$–$C_{20}$ alkyl radical, $C_4$–$C_{20}$ cycloalkyl radical or $C_4$–$C_{20}$ aromatic radical, $R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ acylamino radical; and b is an integer 0–4.

In another aspect, the present invention relates to the single step preparation of a partially crystalline precursor polycarbonate by the melt reaction of an ester-substituted diaryl carbonate with at least one dihydroxy aromatic compound in the presence of a transesterification catalyst.

BRIEF DESCRIPTION OF THE DRAWING

The FIGURE illustrates a device for pelletizing low molecular weight polycarbonate oligomers which are too brittle for conventional pelletization. It shows an extruder coupled to a motorized conveyer which is adapted with a coolant sprayer and pelletizer.

DETAILED DESCRIPTION OF THE INVENTION

Figure 1:
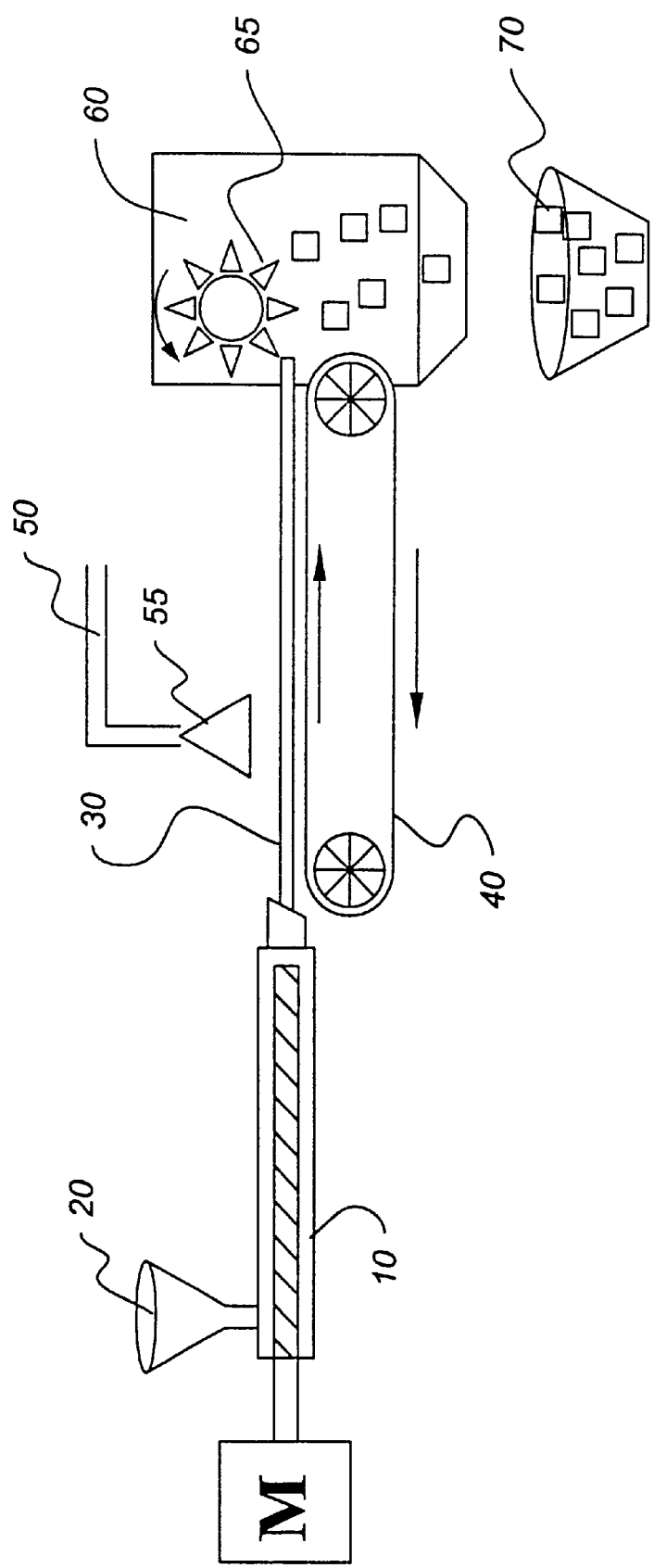

The present invention may be understood more readily by reference to the following detailed description of preferred embodiments of the invention and the examples included herein. In this specification and in the claims which follow, reference will be made to a number of terms which shall be defined to have the following meanings.

"BPA" is herein defined as bisphenol A and is also known as 2,2-bis(4-hydroxyphenyl)propane, 4,4'-isopropylidenediphenol and p,p-BPA.

The term "partially crystalline precursor polycarbonate" refers to an oligomeric polycarbonate having a number average molecular weight of less than about 8000 and percent crystallinity of at least about 15 percent based on differential scanning calorimetry.

The terms "partially crystalline precursor polycarbonate" and "partially crystalline oligomeric polycarbonate" are used interchangeably.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclcopropyl, cyclopentyl cyclohexyl, tetrahydrofuranyl and the like.

As used herein the term "solvent" refers to a single pure solvent such as isopropanol or methylene chloride, or in the alternative to mixtures of solvents such as a mixture of methylene chloride and toluene.

As used herein the term "subatmospheric pressure" is used interchangeably with the term "subambient pressure" and means a pressure lower than the ambient atmospheric pressure.

As used herein the term "supratmospheric pressure" is used interchangeably with the term "suprambient pressure" and means a pressure higher than the ambient atmospheric pressure.

In one aspect, the present invention provides a method of polycarbonate preparation by solid state polymerization. It has been discovered that partially crystalline precursor polycarbonates comprising ester-substituted terminal groups having structure I may be obtained in a single step by the melt reaction of an ester-substituted diaryl carbonate with at least one dihydroxy aromatic compound in the presence of a catalyst, and that such partially crystalline precursor polycarbonates undergo solid state polymerization to afford high molecular weight polycarbonate at useful reaction rates. Useful solid state polymerization reaction rates are observed even where the concentration of terminal hydroxy groups present in the partially crystalline precursor polycarbonates comprising ester-substituted terminal groups having structure I is low relative to partially crystalline precursor polycarbonates prepared, for example by reaction of a dihydroxy aromatic compound with diphenyl carbonate.

Terminal groups having structure I include the methyl salicyl group, structure II, as well as well as other salicyl groups such as the ethyl salicyl, isopropyl

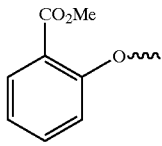

salicyl, and butyl salicyl groups. In one embodiment of the present invention at least 40 percent of the endgroups of the partially crystalline precursor polycarbonates possess structure II. In an another embodiment of the present invention at least 90 percent of the endgroups of the partially crystalline precursor polycarbonates possess structure II.

According to the method of the present invention, polycarbonates are prepared by heating at a temperature between about 120° C. and about 280° C., preferably between 150° C. and about 250° C., and still more preferably between 180° C. and about 230° C., a partially crystalline precursor polycarbonate comprising endgroups having structure I under solid state polymerization conditions. Solid state polymerization conditions are defined broadly as reaction conditions which provide for removal of volatile by-products formed in chain growth steps of the solid state polymerization. The chain growth steps of a solid state polymerization reaction include the condensation reaction between a terminal hydroxy group with a terminal carbonate linkage comprising structure I resulting in the expulsion of an ester-substituted phenol. For example, where structure I is the methyl salicyl group II the monofunctional phenol expelled is methyl salicylate.

Heating under solid state polymerization conditions according to the method of the present invention includes heating a powder or pellets of a partially crystalline precursor polycarbonate comprising terminal endgroups having structure I while contacting said powder or pellets with a flowing inert gas such that volatile by-products formed by condensation reactions taking place in the solid state are entrained by said gas away from said powder or pellets. Alternatively, said volatile by-products may be effectively removed by the application of a vacuum. Thus heating under solid state polymerization conditions according to the method of the present invention includes heating a powder or pellets of a partially crystalline precursor polycarbonate comprising terminal endgroups having structure I in a reaction vessel attached either directly or indirectly to a means for generating a vacuum, such as a vacuum pump. When the solid state polymerization of the present invention is conducted at subatmospheric pressure the pressure in the reaction vessel is preferably in a range between about 0.001 and about 700 mmHg, preferably between about 0.01 and about 100 mmHg and still more preferably between about 0.1 and about 10 mmHg.

Solid state polymerization reactions may be carried out in either a continuous or batch mode in any reaction vessel adapted for contacting a flowing inert gas with a partially crystalline precursor polycarbonate at a temperature in a range between about 120° C. and about 280° C. For example, the reaction vessel may be a vertically or horizontally aligned heated tube equipped for introduction of an inert gas at one end and removal of the inert gas and entrained volatile by-products at the other end. Similarly, the reaction vessel may be a vertically or horizontally aligned heated tube one end of which is attached to a means for generating a vacuum and the other end sealed or adapted for the introduction of an inert gas. Reaction vessels suitable for solid state polymerization are termed solid state polymerization reactors. The inert gas is defined as a gas which does not inhibit the solid state polymerization reaction and includes inert gases such as helium and argon and also relatively inert gases such as nitrogen and hydrogen. Where the solid state polymerization reaction is carried out in a continuous mode the reactor is adapted for continuous introduction of the partially crystalline precursor polycarbonate and continuous removal of the product polycarbonate. In one embodiment of the present invention pellets of the partially crystalline precursor polycarbonate are continuously introduced into a solid polymerization reactor by means of a screw passing through the solid state polymerization reactor which conveys the pellets through said reactor. By means of the same screw pellets of the product polycarbonate emerge from the reactor. The total residence time of the pellets in the reactor should be in a range between about 0.1 and about 6 hours.

In one embodiment of the present invention a partially crystalline precursor polycarbonate comprising terminal endgroups having structure I is heated at a temperature in a range between about 120° C. and about 280° C. in a solid state polymerization reactor for a period of between about 0.1 hours and about 6 hours, preferably between about 0.25 and about 4 hours, and still more preferably between about 0.5 hours and about 2 hours.

The partially crystalline precursor polycarbonates of the present invention have a weight average molecular weight, $M_w$, in a range between about 2000 and about 25000 Daltons, preferably between about 4000 and about and about 20000 Daltons and still more preferably between about 6000 and about 15000 Daltons. The partially crystalline precursor polycarbonates of the present invention have a number average molecular weight $M_n$ in a range between about 900 and about 8000 Daltons, preferably between about 2000 and about 7000 Daltons.

In one embodiment of the present invention the partially crystalline precursor polycarbonates comprising endgroups having structure I possess, in addition, other endgroup structures as well, for example hydroxyl endgroups derived from a dihydroxy aromatic compound or endgroups derived from one or more monofunctional phenols such as p-cumylphenol, phenol, 2,6-xylenol or p-nonylphenol. The relative amounts of hydroxyl endgroups and endgroups having structure I may be controlled by reaction stoichiometry and the conditions under which the partially crystalline precursor polycarbonate is prepared. In one embodiment the precursor polycarbonates of the present invention possess less than about 2000 parts per million (ppm)hydroxyl endgroups. In another embodiment of the present invention the precursor polycarbonates of the present invention possess less than about 500 ppm hydroxyl endgroups. Where endgroups other than structure I are present, they may be derived from monofunctional phenols added during or after the preparation of the partially crystalline precursor polycarbonate. For example, an ester-substituted diaryl carbonate, such as bis-methyl salicyl carbonate, and a bisphenol, such as bisphenol A, and p-cumylphenol will afford according to one aspect of the present invention a partially crystalline precursor polycarbonate comprising p-cumylphenoxy endgroups and endgroups having structure II. Thus, heating at a temperature between about 150° C. and about 230° C. and at a pressure between about 1 and about 15 mmHg a mixture comprising an ester-substituted diaryl carbonate, at least one dihydroxy aromatic compound, at least one transesterification catalyst and at least one monofunctional phenol for a period of time sufficient to effect the removal of from about 80 to about 99 percent of the phenolic by-product formed under the reaction conditions affords in a single step a partially crystalline precursor polycarbonate comprising endgroups derived from both the monofunctional phenol and the ester-substituted diaryl carbonate.

The present invention provides a method of preparing polycarbonate by solid state polymerization, said method comprising heating to a temperature between about 120° C. and about 280° C. under solid state polymerization conditions a partially crystalline precursor polycarbonate comprising endgroups having structure I and structural units derived from at least one dihydroxy aromatic compound. In one embodiment of the present invention said dihydroxy compound is a bisphenol having structure III

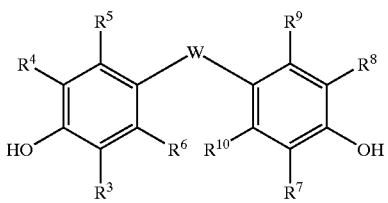

wherein $R^3$–$R^{10}$ are independently a hydrogen atom, halogen atom, nitro group, cyano group, $C_1$-$C_{20}$ alkyl radical $C_4$-$C_{20}$ cycloalkyl radical, or $C_6$-$C_{20}$ aryl radical;

W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

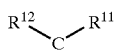

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ aralkyl, $C_5$-$C_{20}$ cycloalkyl groups or a combination thereof.

Suitable bisphenols III are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5- trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene.

In one aspect of the present invention an oligomeric polycarbonate comprising endgroups having structure I is obtained by heating, at a temperature between about 150° C. and about 310° C., a mixture of at least one dihydroxy aromatic compound, at least one transesterification catalyst and an ester-substituted diaryl carbonate IV

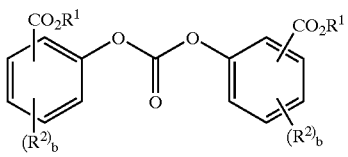

IV wherein $R^1$ is independently at each occurrence $C_1$–$C_{20}$ alkyl radical, $C_4$–$C_{20}$ cycloalkyl radical or $C_4$–$C_{20}$ aromatic radical;

$R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ acylamino radical; and b is independently at each occurrence an integer 0–4.

The reaction between an ester-substituted diaryl carbonate IV and a dihydroxy aromatic compound may be carried out at subambient or suprambient pressure. Removal of the phenolic by-product produced by reaction of the dihydroxy aromatic compound may be effected in order increase the degree of oligomerization and the extent of endcapping by groups derived from diaryl carbonate IV, and to facilitate direct crystallization of the product oligomer. Properties of the product oligomeric polycarbonate such as molecular weight, crystallinity or lack thereof, and end group composition are found to be dependent upon both reaction stoichiometry and the reaction conditions employed.

The product oligomeric polycarbonate comprising endgroups having structure I may be obtained as a partially crystalline or amorphous material by the method of the present invention. Crystallinity, or the absence thereof, is determined by the reaction conditions employed. In one embodiment of the present invention, heating a mixture comprising an ester-substituted diaryl carbonate IV, at least one dihydroxy aromatic compound and at least one transesterification catalyst, at a temperature between about 150° C. and about 230° C. and at a pressure between about 1 and about 15 mmHg, while removing between about 80% and about 99% of the theoretical amount (based on complete reaction between the dihydroxy aromatic compound and the ester-substituted diaryl carbonate) of the ester-substituted phenol by-product, affords in a single step a partially crystalline oligomeric polycarbonate comprising endgroups having structure I. The partially crystalline oligomeric polycarbonate possesses sufficient level of crystallinity to be used directly in solid state polymerization.

Alternatively, an amorphous oligomeric polycarbonate comprising endgroups having structure I may be obtained upon heating a mixture comprising an ester-substituted diaryl carbonate IV, at least one dihydroxy aromatic compound and at least one transesterification catalyst, at a temperature between about 150° C. and about 220° C. while removing about between about 40% and about 60% of the theoretical amount (based on complete reaction between the dihydroxy aromatic compound and the ester-substituted diaryl carbonate) of the ester-substituted phenol by-product, and subsequently raising the temperature to between about 230° C. and about 310° C. while removing additional ester-substituted phenol by-product such that the total amount of ester-substituted by-product removed is in a range between about 80 percent and about 100 percent of the theoretical amount. The amorphous oligomeric polycarbonate may be ground and then crystallized by exposure to a solvent such as isopropanol. Alternatively, the amorphous oligomeric polycarbonate may be extruded and pelletized using the device illustrated in the FIGURE. Useful rates of solid state polymerization for partially crystalline oligomeric polycarbonates prepared in this manner are observed despite the relatively low levels of hydroxy endgroups these for partially crystalline oligomeric polycarbonates contain.

Dihydroxy aromatic compounds suitable for the preparation of partially crystalline or amorphous oligomeric polycarbonates comprising endgroups having structure I include bisphenols having structure III. Suitable bisphenols are illustrated by 2,2-bis(4-hydroxyphenyl)propane (bisphenol A); 2,2-bis(4-hydroxy-3-methylphenyl)propane; 1,1-bis(4-hydroxy-3-methylphenyl)cyclohexane; 1,1-bis(4-hydroxyphenyl)cyclohexane; 1,1-bis(4-hydroxy-3-methylphenyl)cyclohexane; and 1,3-bis(2-(4-hydroxyphenyl)-2-propyl)benzene. Bisphenol A is preferred.

Reaction of an ester-substituted diaryl carbonate with a dihydroxy aromatic compound is catalyzed by transesterification catalysts. Suitable transesterification catalysts include salts of alkaline earth metals, salts of alkali metals, quaternary ammonium compounds, quaternary phosphonium ions, and mixtures thereof. The amount of transesterification catalyst employed is typically in a range between $1 \times 10^{-8}$ and about $1 \times 10^{-2}$, preferably between about $1 \times 10^{-7}$ and about $1 \times 10^{-3}$ moles catalyst per mole dihydroxy aromatic compound employed.

Suitable transesterification catalysts include quaternary ammonium compounds comprising structure V

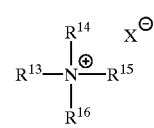

V wherein $R^{13}$–$R^{16}$ are independently a $C_1$-$C_{20}$ alkyl radical, $C_4$-$C_{20}$ cycloalkyl radical or a $C_4$-$C_{20}$ aryl radical and $X^-$ is an organic or inorganic anion. Suitable anions $X^-$ include hydroxide, halide, carboxylate, sulfonate, sulfate, carbonate and bicarbonate. In one embodiment of the present invention the transesterification catalyst comprises tetramethyl ammonium hydroxide.

Additionally, suitable transesterification catalysts include quaternary phosphonium compounds comprising structure VI

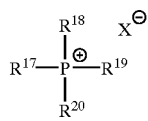

wherein $R^{17}$–$R^{20}$ are independently a $C_1$-$C_{20}$ alkyl radical, $C_4$-$C_{20}$ cycloalkyl radical or a $C_4$-$C_{20}$ aryl radical and $X^-$ is an organic or inorganic anion. Illustrative anions include hydroxide, halide, carboxylate, sulfonate, sulfate, carbonate, and bicarbonate.

Where $X^-$ is a polyvalent anion such as carbonate or sulfate it is understood that the positive and negative charges in structures V and VI are properly balanced. For example, where $R^{13}$–$R^{16}$ in structure V are each methyl groups and $X^-$ is carbonate, it is understood that $X^-$ represents ½ $(CO_3^{-2})$.

In one embodiment of the present invention the transesterification catalyst is tetrabutyl phosphonium acetate. In an alternate embodiment of the present invention the transesterification catalyst comprises a mixture of an alkali metal salt or alkaline earth metal salt with at least one quaternary ammonium compound, or at least one quaternary phosphonium compound, or a mixture thereof, for example a mixture of sodium hydroxide and tetrabutyl phosphonium acetate.

In one embodiment of the present invention the transesterification catalyst is an alkaline earth metal hydroxide, an alkali metal hydroxide or a mixture thereof. Suitable alkaline earth and alkali metal hydroxides are illustrated by calcium hydroxide, magnesium hydroxide, sodium hydroxide and lithium hydroxide.

In another embodiment of the present invention the transesterification catalyst comprises an alkaline earth metal salt of an organic acid, an alkali metal salt of an organic acid, or a salt of an organic acid comprising both alkaline earth metal ions and alkali metal ions. Salts of organic acids useful as transesterification catalysts according to the method of the present invention are illustrated by alkali metal and alkaline earth metal salts of formic acid, acetic acid, stearic acid and ethyelenediamine tetraacetic acid. In one embodiment the transesterification catalyst comprises magnesium disodium ethylenediamine tetraacetate (EDTA magnesium disodium salt).

In yet another embodiment of the present invention the transesterification catalyst comprises the salt of a non-volatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids according the present invention are alkali metal salts of phosphites; alkaline earth metal salts of phosphites; alkali metal salts of phosphates; and alkaline earth metal salts of phosphates. Suitable salts of nonvolatile acids include $NaH_2PO_3$, $NaH_2PO_4$, $Na_2H_2PO_3$, $KH_2PO_4$, $Cs_2PO_4$, $Cs_2PO_4$, and a mixture thereof. In one embodiment, the salt of the nonvolatile acid is $CsH_2PO_4$. In one embodiment of the present invention the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst.

In one aspect of the present invention a low molecular weight precursor polycarbonate comprising endgroups having structure I is extruded and pelletized prior to solid state polymerization. Where the precursor polycarbonate has a low molecular weight the bead or strand emerging from the extruder is not sufficiently strong and pliable to be stranded to a conventional pelletizer. An alternate means of pelletizing low molecular weight polycarbonates has been discovered and is shown in the FIGURE. The low molecular weight precursor polycarbonate is introduced into an extruder 10 through feed inlet 20 and emerges from the extruder as a molten bead or strand 30 which contacts a motorized conveyor 40. A coolant sprayer 50 partially cools the strand by spraying it with a coolant 55. The temperature of the strand is controlled in this manner such that the strand remains ductile. The ductile strand is conveyed to a pelletizer 60 having a rotating cutter blade 65 which chops the cooled strand into pellets 70. Maintaining the strand at a temperature at which the strand remains ductile prevents shattering of the polycarbonate in the pelletizer and allows the formation of pellets.

EXAMPLES

The following examples are set forth to provide those of ordinary skill in the art with a detailed description of how the methods claimed herein are made and evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) analysis, using a polycarbonate molecular weight standard to construct a broad standard calibration curve against which polymer molecular weights were determined. The temperature of the gel permeation columns was about 25° C. and the mobile phase was chloroform.

Examples 1 Through 9

Melt transesterification reactions were carried out in a 500-mL or 1000-L glass batch reactor equipped with a helical agitator, distillation head and a graduated receiving vessel. To remove any adventitious sodium from the glass walls the reactor was soaked in 3N HCl for at least 12 hours followed by rinsing and immersion in deionized water (18 Mohm) for at least 12 hours. The reactor was then dried in an oven overnight prior to use. The reactor was heated by means of a fluidized sand bath with a PID controller. The bath temperature was measured near the interface of the reactor and the sand bath. The pressure over the reactor was controlled by a nitrogen bleed downstream of the receiving flask. Pressure was measured with a MKS pirani gauge. The reactor was charged with solid Bisphenol-A (BPA) 150 g or 300 g (0.6571 or 1.3141 mol) and solid bis-methyl salicyl carbonate (BMSC) such that the molar ratio of BMSC to BPA was between about 1.00 and about 1.15 at the outset of the reaction. The onium salt catalyst, either tetramethyl ammonium hydroxide or tetrabutyl phosponium acetate, was added in an amount corresponding to $2.5 \times 10^{-4}$ moles catalyst per mole BPA. As a co-catalyst either NaOH or EDTA magnesium disodium salt was added in an amount corresponding to $1.0 \times 10^{-6}$ mole catalyst per mole BPA. The combination of tetrabutyl phosponium acetate and EDTA magnesium disodium salt was found to be particularly effective. The reactor was, sealed and the atmosphere was exchanged with nitrogen three times. With the final nitrogen exchange the pressure in the reactor was brought to between about 5 and about 15 mmHg. In a first stage, the reactor was submerged into the fluidized bath at 170° C. After five minutes, agitation was begun at a rate of 60 rpm. After an additional ten to fifteen minutes the reactants were fully melted and the agitator speed was increased to 200 rpm. The reaction mixture was stirred and heated while liberated methyl salicylate was collected in the receiving vessel. To obtain lower molecular weight crystalline oligomers, methyl salicylate was distilled from the reaction vessel until between about 90 and about 95 percent of the theoretical amount (based on complete reaction between BPA and the BMSC) of the methyl salicylate by-product had been removed. The reaction vessel was then removed from the sand bath and the vessel was gently purged with nitrogen gas. Upon cooling, the crystalline oligomeric product was observed to contract and fracture. The cooled crystalline product was easily poured from the reactor. Data for such a single step preparation of partially crystalline BPA polycarbonate oligomers is gathered in Table 1. The ratio "BMSC/BPA" represents the mole ratio of bis-methyl salicyl carbonate to BPA employed. The symbol "[OH]" is expressed in parts per million (ppm) and represents the concentration of free hydroxyl groups found in the product polycarbonate. The free hydroxyl group concentration was determined by quantitative infrared spectroscopy. "EC (%)" represents the percentage of polymer chain ends not terminating in a hydroxyl group. Salicyl endgroups were determined by HPLC analysis after product solvolysis. The term "% Cryst" represents the percent crystallinity of the product polycarbonate and was determined by differential scanning calorimetry. The data in Table 1 reveal that highly endcapped oligomeric polycarbonates having a sufficient level of crystallinity to undergo solid state polymerization without fusing may be obtained directly and rapidly by simply reacting bisphenol A with BMSC under mild reaction conditions.

TABLE 1

CRYSTALLINE METHYL SALICYL ENCAPPED OLIGOMERS

| Example | BMSC/BPA | Mw | Mn | [OH] | EC(%) | % Cryst |
|---|---|---|---|---|---|---|
| 1 | 1.05 | 9400 | 4017 | 778 | 90.8 | 22 |
| 2 | 1.03 | 12864 | 6026 | 1017 | 82.0 | 31 |
| 3 | 1.02 | 15486 | 6553 | 1025 | 80.2 | 30 |
| 4 | 1.017 | 16035 | 7021 | 959 | 80.2 | 30 |

Alternatively, higher molecular weight oligomers could be prepared by distilling approximately 50 percent of the theoretical amount of methyl salicylate by-product at 170° C. at a pressure between about 5 and about 15 mmHg, and then in a second heating stage raising the bath temperature to about 210° C. The reaction mixture was heated at 210° C. until between about 90% and about 95% of the theoretical amount of methyl salicylate by-product had been collected. The reaction vessel was then removed from the sand bath and the vessel was gently purged with nitrogen gas. Upon cooling, the crystalline oligomeric product was observed to contract and fracture. The cooled crystalline product was easily poured from the reactor.

To produce amorphous oligomers the temperatures of the first and second stages identified above were increased to about 210° C. and about 240° C. respectively and the reaction was stopped when between about 80% and about 90% of the theoretical amount of methyl salicylate had been collected. Very highly endcapped oligomers could be obtained by heating the reaction mixture at 240° C. under vacuum until no further distillation of methyl salicylate was observed. Data are gathered in Table 2 for amorphous polycarbonate oligomers having very low levels of free hydroxy groups and a very high level of endcapping by methyl salicylate groups.

The molecular weights of the oligomeric polycarbonates are sensitive to the reaction stoichiometry. Thus the greater the stoichiometric imbalance (as evidenced by the BMSC/BPA ratio), the lower the oligomer molecular weight. Moreover, the molecular weight observed is close to the theoretical value predicted from the stoichiometric imbalance. Amorphous polycarbonate oligomers such as those illustrated in Table 2 could be crystallized upon exposure to isopropanol at 100° C. for a period of about 15 minutes.

TABLE 2

AMORPHOUS METHYL SALICYL ENCAPPED OLIGOMERS

| Example | BMSC/BPA | Mw | Mn | [OH] | EC(%) |
|---|---|---|---|---|---|
| 5 | 1.042 | 12906 | 5697 | 109 | 98.2 |
| 6 | 1.052 | 10853 | 4973 | 96 | 98.6 |
| 7 | 1.064 | 9547 | 3871 | 189 | 97.9 |
| 8 | 1.087 | 6885 | 3134 | 0 | 100 |
| 9 | 1.136 | 4376 | 2013 | 0 | 100 |

Comparative Examples 1 Through 6

Amorphous polycarbonate oligomers incorporating phenoxy endgroups were obtained by reacting bisphenol A (BPA) and diphenyl carbonate (DPC) using a method analogous to that used to prepare the methyl salicyl endcapped polycarbonate oligomers of Examples 5–9. Comparative Example 6 is illustrative.

Comparative Example No. 6

The reactor, equipped and passivated as in Examples 1–9, was charged at ambient temperature and pressure with solid bisphenol A (General Electric Plastics Japan Ltd., 0.08761 mol) solid diphenyl carbonate (General Electric Plastics Japan Ltd., 0.1043 mol). The catalyst, a combination of EDTA magnesium disodium salt (Alfa Aesar, $1\times10^{-6}$ mole per mole bisphenol A) and tetrabutyl phosphonium acetate (Sachem, $2.5\times10^{-4}$ mole per mole bisphenol A) added as two solutions in deionized (18 MOhm) water, was injected into the bisphenol A layer and the reactor assembled. The reactor was then evacuated briefly and nitrogen was reintroduced. This degassing step was repeated three times. The reactor brought to 15 mmHg with $N_2$ and was then lowered into the sand bath maintained at 170° C. The stirring was set to 60 rpm. After 5 minutes the stirring rate was increased to 250 rpm. These conditions were maintained for 25 minutes. The temperature of the bath was then raised to 210° C. over a five-minute period. The mixture was held at 210° C. and 15 mmHg for 10 minutes. The temperature was then raised to 240° C. over a five minute period. The pressure was then lowered to 1.0 mmHg and the reaction mixture was stirred at 240° C. and 1.0 mmHg for 20 minutes. The reaction vessel was then raised from the sand bath and the molten product polymer was scooped from the reaction vessel into a liquid nitrogen bath in order to quench the reaction. The product was characterized by gel permeation chromatography and found to have $M_w$=6535 Daltons and $M_n$=2952 Daltons.

Data for polycarbonate oligomers of Comparative Examples 1–6 are gathered in Table 3 below. The ratio "DPC/BPA" is the mole ratio of DPC to BPA employed as starting materials. In contrast to the BMSC-based oligomers, polycarbonate oligomers based upon DPC do not exhibit decreasing molecular weight as the ratio of DPC to BPA increases. In contrast to the oligomerization of BPA with BMSC, the highest oligomer molecular weights were achieved at the highest DPC/BPA ratio employed. See Comparative Example 6 (CE-6). This illustrates the sensitivity of the product oligomeric polycarbonate molecular weights to the reaction conditions rather than reaction stoichiometry when DPC is employed as the diaryl carbonate in melt oligomerization reactions. This represents an important limitation of oligomeric polycarbonate formation based upon DPC, namely the inability to control the molecular weight of the oligomeric polycarbonate product by adjustment of the initial molar ratios of the DPC and the dihydroxy aromatic compound employed. The method of the present invention overcomes this limitation. In one aspect, the method of the present invention provides oligomeric polycarbonates for solid state polymerization and other applications requiring oligomeric polycarbonates and allows control of the product oligomeric polycarbonate molecular weight based upon the molar ratio of ester-substituted diaryl carbonate and dihydroxy aromatic compound employed. Moreover, the method of the present invention provides oligomeric polycarbonates which because they possess reactive endgroups having structure I, are disposed to further reaction with a variety of nucleophiles, including monofunctional phenols and difunctional phenols such as bisphenols having structure III.

TABLE 3

COMPARATIVE EXAMPLES PHENOXY ENCAPPED OLIGOMERS

| Example | DPC/BPA | Mw | Mn | [OH] | EC(%) |
|---------|---------|------|------|-------|-------|
| CE-1    | 1.042   | 1920 | 953  | 17338 | 51.4  |
| CE-2    | 1.064   | 1634 | 841  | 17800 | 55.8  |
| CE-3    | 1.087   | 1531 | 817  | 17052 | 59.0  |
| CE-4    | 1.111   | 2115 | 1014 | 13396 | 58.9  |
| CE-5    | 1.136   | 3727 | 1704 | 8299  | 58.4  |
| CE-6    | 1.191   | 6535 | 2952 | 4544  | 60.5  |

Solid State Polymerizations

The solid state polymerization reactor used in Examples 10–13 and in Comparative Example No. 7 (CE-7) was a 50 milliliter (mL) stainless steel tubular tumbler reactor. The reactor was positioned horizontally in a forced convection oven. Nitrogen sweep gas was introduced at one end and the stream of entrained polymerization by-products was removed at the other end. The nitrogen was preheated to the oven temperature prior to its introduction into the tumbler reactor. The tumbler reactor had dimensions of approximately 2.5 inches in diameter and 5 inches in length. The reactor was equipped with two ½ inch (diameter) inlet tubes welded on either end of the reactor which served as the axis of rotation and sweep gas introduction and exit means. The reactor was rotated at a rate between about 3 and about 10 rpm.

In the SSP Examples 10–13 the partially crystalline methyl salicyl endcapped oligomers prepared in Examples 1–4 were employed. In SSP Comparative Example 7 the oligomeric polycarbonate of Comparative Example 6 was crystallized by exposure first to isopropanol vapor (2 hours at 140° C.) followed by soaking in liquid acetone (2 hours at ambient temperature, then dried) prior to SSP. The partially crystalline oligomeric polycarbonates were ground in a Henschel mixer to provide a powder having a mesh size of approximately 20. The powdered oligomer, 4 grams, was loaded into the tumbler reactor, and the reactor was introduced into the convection oven which had been preheated to 200° C. Nitrogen was passed through the tumbling powder at a rate of 500 mL per minute. The solid state polymerization was conducted for 20 minutes at 200° C. and then at 220° C. for 20 minutes. The product polycarbonate was then removed from the reactor and characterized. Data for Examples 10–13 are gathered in Table 4 and demonstrate the surprisingly rapid rates of molecular weight build when highly endcapped oligomers comprising methyl salicyl endgroups are subjected to solid state polymerization conditions. Moreover, the product polycarbonates prepared by solid state polymerization of the methyl salicyl endcapped oligomers retain a very high level of endcapping and correspondingly low levels of terminal OH groups. The methyl salicyl endgroups retained in the product polycarbonates may be displaced by an exogenous phenol or other nucleopihle to provide new materials.

TABLE 4

SOLID STATE POLYMERIZATION OF METHYL SALICYL ENCAPPED OLIGOMERS

| Example | Initial Mw | Final Mw | Polymerization time | [OH] final | EC(%) final |
|---------|------------|----------|---------------------|------------|-------------|
| 10      | 9400       | 12363    | 40 minutes          | 78 ppm     | 98.8        |
| 11      | 12864      | 17677    | 40 minutes          | 181 ppm    | 95.7        |
| 12      | 15486      | 27968    | 40 minutes          | 109 ppm    | 95.5        |
| 13      | 16035      | 28656    | 40 minutes          | 112 ppm    | 94.7        |
| CE-7    | 6412       | 12700    | 40 minutes          |            | ~60         |

Where the methyl salicyl endcapped oligomeric polycarbonate is amorphous as in Examples 5–9, the amorphous polycarbonate oligomer may be crystallized by exposure to a solvent such as isopropyl alcohol. Thus, an amorphous polycarbonate oligomer as in Examples 5–9 may be ground, for example in a Henschel mixer, and exposed to solvent vapors or liquid solvent in order to induce crystallinity. In one instance, 50 grams of amorphous polycarbonate powder and isopropyl alcohol (5 grams) were placed in a hermetically sealed vessel. The vessel was evacuated, heated in a forced convection oven to approximately 100° C. while being rotated for a period of 15 minutes following temperature equilibration. The vessel was cooled and then vented. The crystalline product powder was then dried and characterized. Crystalline methyl salicyl endcapped oligomers prepared in this manner typically have percent crystallinities (% Cryst) of between about 20 and about 30 percent and are suitable for use in solid state polymerization. Data are gathered in Table 5 which illustrate the crystallization of amorphous methyl salicyl endcapped polycarbonate oligomers and subsequent solid state polymerization. Example 14 illustrates the crystallization and solid state polymerization of an amorphous oligomeric polycarbonate comprising methyl salicyl endgroups. In Example 14, the amorphous oligomeric polycarbonate employed was prepared by reacting BMSC and BPA together with 3 percent p-cumylphenol based on moles of BPA. The ratio of BMSC to BPA employed was 1.02 moles BMSC per mole of BPA. The amorphous oligomeric polycarbonate comprising both methyl salicyl and p-cumylphenol endgroups was ground in a Henschel mixer and exposed to isopropanol vapor for 1 hour at 140° C. Solid state polymerization conditions used in Example 14 consisted of heating the crystalline oligomeric polycarbonate at 200° C. for 10 minutes followed by heating at 240° C. for 20 minutes under a stream of nitrogen in a the tubular SSP reactor described earlier.

In addition, partially crystalline polycarbonate oligomers incorporating methyl salicyl endgroups obtained directly from the melt as in Examples 1–4, may be further crystallized by exposure to a solvent such as isopropanol under mild conditions and then subjected to solid state polymerization. Example 15 is illustrative of this process. In Example 15 the partially crystalline oligomeric polycarbonate obtained by melt reaction of BMSC with BPA was exposed briefly to isopropanol

TABLE 5

CRYSTALLIZATION AND SOLID STATE POLYMERIZATION OF AMORPHOUS METHYL SALICYL ENDCAPPED OLIGOMERS

| Example | Crystallization time | °C. | BMSC/BPA | Initial Mw | Final Mw |
|---------|----------------------|------|----------|------------|----------|
| 14 | 1 hr | 140 | 1.02 | 6374 | 29000 |
| 15 | 0.25 hr | 100 | 1.017 | 9537 | 31400 |
| CE-8 | 1 hr | 140 | — | 7170 | 30900 | vapor at 100° C. for 15 minutes to provide a partially crystalline oligomeric polycarbonate having enhanced crystallinity relative to the starting partially crystalline oligomeric polycarbonate obtained directly from the melt. The solid state polymerization reaction was carried out by heating the partially crystalline oligomeric polycarbonate having enhanced crystallinity under solid state polymerization conditions at 180° C. for 20 minutes followed by heating at 220° C. for 20 minutes.

Comparative Example No. 8 (CE-8) illustrates additional solid state polymerization behavior of an amorphous oligomeric polycarbonate prepared by the melt reaction of diphenyl carbonate with BPA. The starting amorphous oligomeric polycarbonate had a percent endcap value (% EC) of about 59% and was crystallized by exposure of the amorphous powder to isopropanol vapors at 140° C. The partially crystalline oligomeric polycarbonate was heated under solid state polymerization conditions at 220° C. for 2 hours followed by 240° C. for 2 hours.

The invention has been described in detail with particular reference to preferred embodiments thereof, but it will be understood by those skilled in the art that variations and modifications can be effected within the spirit and scope of the invention.

What is claimed is:

1. A method of preparing polycarbonate by solid state polymerization, said method comprising heating to a temperature between about 120° C. and about 280° C. under solid state polymerization conditions a partially crystalline precursor polycarbonate comprising structural units derived from at least one dihydroxy aromatic compound, and endgroups having structure I

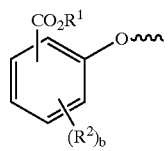

wherein $R^1$ is a $C_1$–$C_{20}$ alkyl radical, $C_4$–$C_{20}$ cycloalkyl radical or $C_4$–$C_{20}$ aromatic radical, $R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ acylamino radical; and b is an integer 0–4.

2. A method according to claim 1 wherein said solid state polymerization conditions include heating in a solid state polymerization reactor for a period of from about 0.25 hours to about 4 hours.

3. A method according to claim 2 wherein the solid state polymerization reaction is carried out in the presence of an inert gas.

4. A method according to claim 3 wherein said temperature is in a range between about 180° C. and about 230° C.

5. A method according to claim 1 comprising heating said partially crystalline precursor polycarbonate at subambient pressure.

6. A method according to claim 5 wherein said pressure is in a range between about 0.01 mmHg and 700 mmHg.

7. A method according to claim 1 wherein the partially crystalline precursor polycarbonate has a weight average molecular weight in a range between about 2000 and about 25000 Daltons.

8. A method according to claim 1 wherein the partially crystalline precursor polycarbonate has a number average molecular weight in a range between about 900 and about 8000 Daltons.

9. A method according to claim 1 wherein the partially crystalline precursor polycarbonate has less than 500 parts per million free hydroxy terminal groups.

10. A method according to claim 1 wherein structure I is the methyl salicyl group II

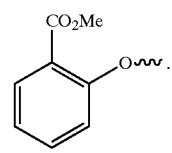

11. A method according to claim 10 wherein the methyl salicyl structure comprises at least 40 percent of the polymer endgroups.

12. A method according to claim 1 in which said dihydroxy aromatic compound is a bisphenol having structure III

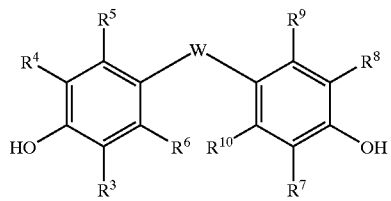

wherein $R^3$–$R^{10}$ are independently a hydrogen atom, halogen atom, nitro group, cyano group, $C_1$-$C_{20}$ alkyl radical $C_4$-$C_{20}$ cycloalkyl radical, or $C_6$-$C_{20}$ aryl radical;

W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

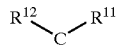

wherein $R^{11}$ and $R^{12}$ are independently a hydrogen atom, $C_1$–$C_{20}$ alkyl radical, $C_4$–$C_{20}$ cycloalkyl radical, or $C_4$–$C_{20}$ aryl radical; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or combination thereof.

13. A method according to claim 12 wherein bisphenol III is bisphenol A.

14. A method according to claim 1 wherein the partially crystalline precursor polycarbonate is obtained by a method comprising heating in the melt at a temperature between about 150° C. and about 310° C. a mixture of at least one dihydroxy aromatic compound, at least one transesterification catalyst and an ester-substituted diaryl carbonate IV

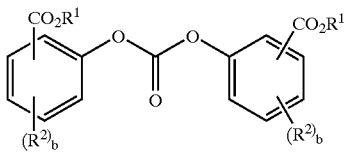

wherein $R^1$ is independently at each occurrence $C_1$–$C_{20}$ alkyl radical, $C_4$–$C_{20}$ cycloalkyl radical or $C_4$–$C_{20}$ aromatic radical, $R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ acylamino radical; and b is independently at each occurrence an integer 0–4.

15. A method according to claim 14 wherein said dihydroxy aromatic compound is a bisphenol having structure III

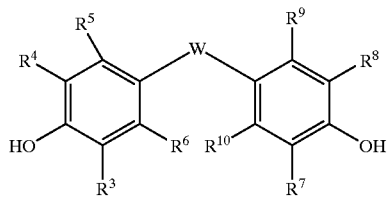

wherein $R^3$–$R^{10}$ are independently a hydrogen atom, halogen atom, nitro group, cyano group, $C_1$–$C_{20}$ alkyl radical $C_4$–$C_{20}$ cycloalkyl radical, or $C_6$–$C_{20}$ aryl radical;

W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

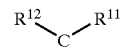

wherein $R^{11}$ and $R^{12}$ are independently a hydrogen atom, $C_1$–$C_{20}$ alkyl radical, $C_4$–$C_{20}$ cycloalkyl radical, or $C_4$–$C_{20}$ aryl radical; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

16. A method according to claim 15 wherein said bisphenol III is selected from the group consisting of 2,2-bis(4-hydroxyphenyl)propane (bisphenol A); 2,2-bis(4-hydroxy-3-methylphenyl)propane; 1,1-bis(4-hydroxy-3-methylphenyl)cyclohexane; 1,1-bis(4-hydroxyphenyl)cyclohexane; 1,1-bis(4-hydroxy-3-methylphenyl)cyclohexane; and 1,3-bis(2-(4-hydroxyphenyl)-2-propyl)benzene.

17. A method according to claim 14 wherein said transesterification catalyst comprises an alkaline earth salt, an alkali metal salt or a mixture thereof.

18. A method according to claim 17 wherein the alkaline earth salt or the alkali metal salt is the salt of a non-volatile acid.

19. A method according to claim 18 further comprising a basic co-catalyst.

20. A method according to claim 17 wherein said transesterification catalyst further comprises a quaternary ammonium compound, a quaternary phosphonium compound or a mixture thereof.

21. A method according to claim 20 wherein said quaternary ammonium compound has structure comprises structure V

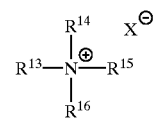

wherein $R^{13}$–$R^{16}$ are independently a $C_1$–$C_{20}$ alkyl radical, $C_4$–$C_{20}$ cycloalkyl radical or a $C_4$–$C_{20}$ aryl radical and $X^-$ is an organic or inorganic anion.

22. A method according to claim 21 wherein said anion is at least one anion selected from the group consisting of hydroxide, halide, carboxylate, sulfonate, sulfate, carbonate, and bicarbonate.

23. A method according to claim 21 wherein said quaternary ammonium compound is tetramethyl ammonium hydroxide.

24. A method according to claim 20 wherein said phosphonium compound comprises structure VI

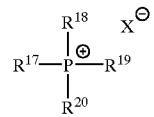

wherein $R^{17}$–$R^{20}$ are independently a $C_1$–$C_{20}$ alkyl radical, $C_4$–$C_{20}$ cycloalkyl radical or a $C_4$–$C_{20}$ aryl radical and $X^-$ is an organic or inorganic anion.

25. A method according to claim 24 wherein said anion is selected from the group consisting of hydroxide, halide, carboxylate, sulfonate, sulfate, carbonate, and bicarbonate.

26. A method according to claim 25 wherein said quaternary phosphonium compound is tetrabutyl phosphonium acetate.

27. A method according to claim 17 wherein said salt is selected from the group consisting of alkaline earth hydroxides and alkali metal hydroxides.

28. A method according to claim 27 wherein the transesterification catalyst is sodium hydroxide.

29. A method according to claim 17 wherein said alkaline earth and alkali metal salts are salts of organic acids.

30. A method according to claim 29 wherein said salts of organic salts are selected from the group consisting of salts of formic acid, acetic acid, stearic acid and ethyelenediamine tetraacetic acid.

31. A method according to claim 30 wherein said salt is magnesium disodium ethylenediamine tetraacetate.

32. A method according to claim 31 wherein said partially crystalline precursor polycarbonate is obtained directly from the melt as a partially crystalline polycarbonate.

33. A method according to claim 14 wherein said partially crystalline precursor polycarbonate is obtained by solvent induced crystallization of an amorphous precursor polycarbonate.

34. A method according to claim 33 wherein said solvent is isopropanol.

35. A method for preparing polycarbonate by solid state polymerization, said method comprising heating to a temperature between 120° and 230° C. for a period of between about 0.25 and about 4 hours under solid state polymerization conditions a partially crystalline precursor polycarbonate comprising endgroups having the methyl salicyl structure II

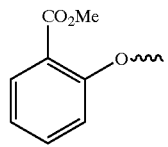

II and repeat units derived from at least one dihydroxy aromatic compound.

36. A method according to claim 35 wherein said dihydroxy aromatic compound is bisphenol A.

37. A method according to claim 36 wherein said partially crystalline precursor polycarbonate is prepared by a method comprising heating at a temperature in a range between about 150° C. and about 230° C. bis-methyl salicyl carbonate in a mixture with bisphenol A and at least one transesterification catalyst, said bis-methyl salicyl carbonate being present in an amount such that the molar ratio of bis-methyl salicyl carbonate to bisphenol A is in a range from about 0.9 to about 1.25, said catalyst being present in a range between about $1\times10^{-8}$ to about $1\times10^{-2}$ moles transesterification catalyst per mole bisphenol A.

38. A method according to claim 37 wherein said mixture further comprises p-cumylphenol.

39. A method according to claim 38 wherein said temperature is in a range between about 150° C. and about 190° C.

40. A method according to claim 39 wherein said molar ratio of bis-methyl salicyl carbonate to bisphenol A is in a range from about 0.95 to about 1.05.

41. A method according to claim 40 wherein the transesterification comprises sodium hydroxide.

42. A method according to claim 41 wherein the transeterification catalyst further comprises a quaternary ammonium compound, a quaternary phosphonium compound or a mixture thereof.

43. A method according to claim 42 wherein the transesterification catalyst comprises tetramethyl ammonium hydroxide, or tetrabutyl phosphonium acetate, or mixture thereof.

44. A method for preparing a partially crystalline precursor polycarbonate comprising endgroups having structure I

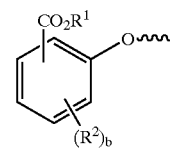

I wherein $R^1$ is a $C_1$–$C_{20}$ alkyl radical, $C_4$–$C_{20}$ cycloalkyl radical or $C_4$–$C_{20}$ aromatic radical.

$R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkysulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkysulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ acylamino radical;

b is an integer 0–4;

said method comprising heating at a temperature between about 150° C. and about 220° C. and at a pressure between about 1 and about 15 mmHg a mixture comprising an ester-substituted diaryl carbonate, at least one dihydroxy aromatic compound and at least one transesterification catalyst to produce a polycarbonate oligomer and a phenolic by-product, said mixture being heated for a period of time sufficient to effect the removal of from about 80 to about 99 percent of said phenolic by-product formed under the reaction conditions.

45. A method according to claim 44 wherein said ester substituted diaryl carbonate is bis-methyl salicyl carbonate.

46. A method according to claim 45 wherein said dihydroxy aromatic compound is bisphenol A.

47. A method according to claim 46 wherein said transesterification catalyst comprises sodium hydroxide.

48. A method according to claim 44 wherein the transesterification catalyst comprises at least one salt of a nonvolatile acid selected from the group consisting of $NaH_2PO_3$, $NaH_2PO_4$, $Na_2H_2PO_3$, $KH_2PO_4$, $CsH_2PO_4$, and $Cs_2H_2PO_4$.

49. A method according to claim 48 wherein said transesterification catalyst further comprises an quaternary ammonium compound, a quaternary phosphonium compound, or a mixture thereof.

50. A method according to claim 49 wherein said ammonium compound is tetramethyl ammonium hydroxide, and said phosphonium compound is tetrabutyl phosphonium acetate.

* * * * *